United States Patent
Oliveira (10) Patent No.: US 7,720,515 B2
(45) Date of Patent: May 18, 2010

(54) APPARATUS AND METHOD FOR REDUCING POWER CONSUMPTION IN A MOBILE UNIT

(75) Inventor: Louis Dominic Oliveira, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 847 days.

(21) Appl. No.: 09/865,145

(22) Filed: May 24, 2001

(65) Prior Publication Data

US 2002/0177474 A1    Nov. 28, 2002

(51) Int. Cl.
  *H04B 1/38* (2006.01)
(52) U.S. Cl. .......................... 455/574; 381/74
(58) Field of Classification Search ................. 455/574, 455/572, 556, 553, 186.1, 187.1, 850.1; 370/311; 381/1, 2, 11, 119, 123; 700/94
  See application file for complete search history.

(56) References Cited

U.S. PATENT DOCUMENTS

| | | | |
|---|---|---|---|
| 6,272,116 B1 * | 8/2001 | Kurihara | 370/311 |
| 6,594,366 B1 * | 7/2003 | Adams | 381/74 |
| 6,748,085 B1 * | 6/2004 | Yang | 381/11 |

FOREIGN PATENT DOCUMENTS

| | | |
|---|---|---|
| GB | 1358029 | 6/1974 |
| JP | 11017572 | 10/1982 |
| WO | 0033469 | 6/2000 |
| WO | 0070781 | 11/2000 |

OTHER PUBLICATIONS

International Search Report—PCT/US02/016530, International Searching Authority—European Patent Office—Sep. 26, 2002.
International Preliminary Examination Report—PCT/US02/016530, IPEA/US, Oct. 18, 2003.
Written Opinion—PCT/US02/016530, IPEA/US—Feb. 27, 2003.

* cited by examiner

*Primary Examiner*—Erika A Gary
(74) *Attorney, Agent, or Firm*—Eric Ho (57) ABSTRACT

In a disclosed embodiment, a mobile unit includes a codec, a vocoder, and an audio decoder. The vocoder and the audio decoder provide respective outputs to an audio mux. A stereo/mono control unit receives an audio mux input from the audio mux. A control output generated by the stereo/mono control unit is coupled to a number of components in a receive audio processing path of the codec. By disabling at least one of the components in, for example, the right channel of the receive audio processing path of the codec, the control output of the stereo/mono control unit results in significant power savings. Such disabling can occur, for example, when the audio mux input received by the stereo/mono control unit contains voice signals, as opposed to music signals.

32 Claims, 4 Drawing Sheets

APPARATUS AND METHOD FOR REDUCING POWER CONSUMPTION IN A MOBILE UNIT

BACKGROUND OF THE INVENTION

1. Field

The present invention generally relates to apparatus and method for saving power in mobile units and more particularly to saving power in stereo audio codecs utilized in mobile units.

2. Related Art

Traditionally, mobile units, such as cellular phones, primarily used analog communications, such as FM, for radio transmission. Currently, digital communications, such as code division multiple access ("CDMA"), are the dominant form of transmission because they allow more users to occupy the bandwidth, and at the same time improve voice quality and reliability.

For digital communication techniques to be used on the reverse link, audio signals, such as voice, must be converted from an analog signal to a digital signal. Conversely, on the forward link, the received digital signal must be converted to an analog signal in order to be played by the mobile unit speaker. An audio coder/decoder capable of performing both directions of analog/digital conversion is commonly referred to as a "codec." Codecs are in general use in various mobile units, such as cellular phones.

As is known in the art, mobile units, such as cellular phones, are generally battery operated. Extended battery life is a desired feature in today's cellular phone market. In addition to long battery life, an attractive product must have the latest features, such as capability to play music, to be competitive with competing manufacturers.

New features such as music capabilities, in which users can listen to MP3 audio, are becoming increasingly popular in current cellular phones. Such devices require stereo codecs as opposed to mono codecs found in older cellular phones.

Figure 1:
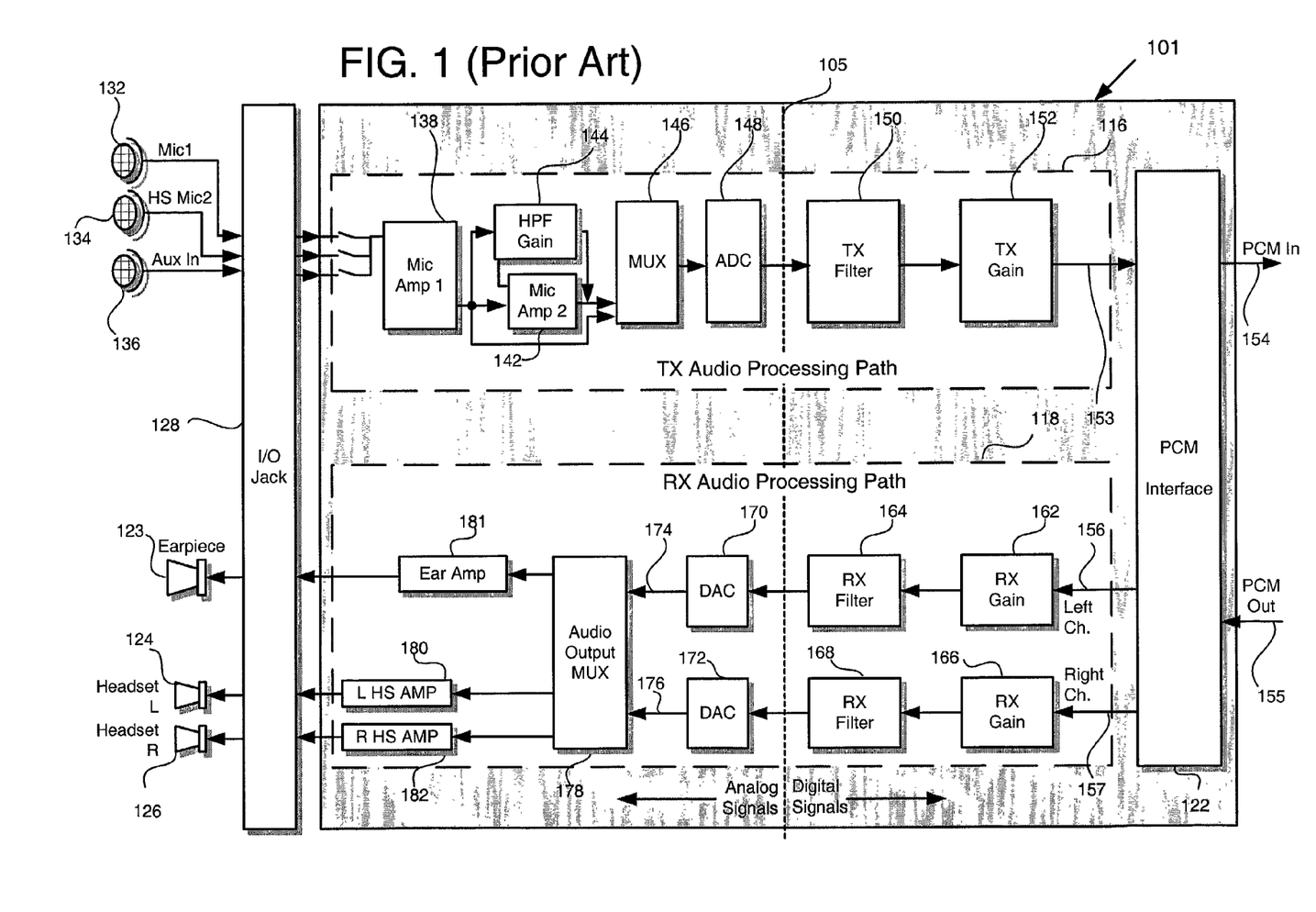
FIG. 1 illustrates an example of a known codec.

The exemplary stereo audio codec 101 in FIG. 1 can be part of a digital cellular phone that can play stereo audio. Stereo audio codes 101 converts audio analog signals to digital signals for transmission in the reverse link. Stereo audio codec 101 is also used for converting digital signals to audio analog signals for outputting the caller's voice on the phone's speaker in the forward link, or for playing audio.

Exemplary stereo audio codec 101 consists of two audio processing paths 116 and 118. The transmit audio processing path 116 is used, for example, to convert the analog voice signal of a user to a digital voice signal. A brief description of transmit audio processing path 116 follows.

Voice signal input can originate from the mobile unit microphone 132, a headset microphone 134, or an auxiliary input 136, which is connected to stereo audio codec 101 by way of an I/O jack 128. I/O jack 128 provides input to a first microphone amp 138 that amplifies the input analog signal. The output analog signal of first microphone amp 138 may optionally be amplified again by a second microphone amp 142 and/or filtered by high pass filter and gain 144 depending on the type of input. For example, optional filtering may be performed on the auxiliary input 136.

Mux 146 may select output of high pass filter and gain 144 or it may select output of first microphone amp 138. The output of mux 146 is coupled to analog-to-digital converter 148, which converts an inputted analog voice signal to a digital voice signal. Signals to the right of divider 105 are digital signals. The digital voice signal is then filtered by transmit filter 150 and amplified by transmit gain 152 to produce transmitted voice pulse code modulation ("PCM") 153. Transmitted voice PCM is sent to PCM interface 122, which is then sent for further processing such as voice compression through PCM "input" signal 154.

Receive audio processing path 118 is similar to transmit audio processing path 116 except that the signals flow in the opposite direction and that there are two signal paths for the left and right channel. PCM "output" signal 155 interfaces stereo audio codec 101 by way of PCM interface 122. The "output" in PCM "output" signal 155 refers to "output samples" that ultimately arrive at one or more speaker outputs, either earpiece speaker 123, left headset speaker 124, and/or right headset speaker 126.

If the PCM "output" signal 155 is stereo, PCM interface 122 splits the signal between left channel digital signal 156 and right channel digital signal 157 for separate processing. The left channel digital signal 156 is amplified by receive gain 162 and filtered by receive filter 164. The output of receive filter 164 is then converted to an analog output through digital-to-analog converter 170. Signals to the left of divider 105 are analog signals. The same processing of receive gain 166, receive filter 168, and digital-to-analog converter 172 is performed for the right channel as well.

Outputs of left and right channel digital-to-analog converters 174 and 176, respectively, provide inputs to audio output mux 178. Audio output mux 178 directs analog outputs to either earpiece amp 181 or left and right headset amps 180 and 182, respectively, depending on what type of audio output device is connected or not connected to I/O jack 128.

Stereo audio codecs consume substantially more power than mono audio codecs, which were used on previous generations of cellular phones. Stereo audio codecs can consume approximately 45% more power than mono audio codecs because they have an extra audio processing path to produce both left and right channels, as shown in receive audio processing path 118.

If PCM output signal 155 is mono and a mono headset is attached, it is desirable to only have one of the channels in the receive audio processing path 118 enabled (i.e., turned on) and the other channel disabled (i.e., turned off). For example, if the right channel is the "non-default" channel, it is desirable to have the right channel containing components such as receive gain 166, receive filter 168, and digital-to-analog converter 172 disabled.

However, according to known techniques employed in stereo audio codecs, there is no method of conserving power by shutting down audio processing components of the "non-default" channel such as receive gain 166, receive filter 168, and digital-to-analog converter 172 in the right channel.

Also, when stereo headset speakers are connected to I/O jack 128 and PCM output signal 155 is mono, it is abnormal for the user to hear audio on only one speaker of a stereo headset if PCM output signal 155 is mono. For system 101 in FIG. 1, a known method of placing a mono signal on both speakers is to simply duplicate the mono signal on left and right channels at 156 and 157. In this method, left channel receive gain 162, receive filter 164, and digital-to-analog converter 170 will be on as well as corresponding right channel components receive gain 166, receive filter 168, and digital-to-analog converter 172. However, this method, although easy to implement, consumes power for both stereo processing paths.

Unless novel techniques for conserving power in a stereo audio codec are used, mobile units, such as cellular phones, will have shorter battery life, which may lead to poor sales and user dissatisfaction. There is therefore a need in the art for efficient power management for stereo audio codecs in mobile units, such as cellular phones.

SUMMARY OF THE INVENTION

According to one aspect of the present invention, an embodiment of the invention is a mobile unit which includes a codec, a vocoder, and an audio decoder. The vocoder and the audio decoder provide respective outputs to an audio mux. A stereo/mono control unit receives an audio mux input from the audio mux. The stereo/mono control unit provides a control output to the codec to reduce power consumption in the codec and thus in the mobile unit.

The control output generated by the stereo/mono control unit is coupled to a number of components in a receive audio processing path of the codec. For example, the control output can be coupled to components such as a receive gain, a receive filter, a digital-to-analog converter, a left/right selector, and a headset amp in a right channel of the receive audio processing path.

By disabling at least one of the components in, for example, the right channel of the receive audio processing path of the codec, the control output of the stereo/mono control unit results in significant power savings. Such disabling can occur, for example, when the audio mux input received by the stereo/mono control unit contains voice signals, as opposed to music signals.

DETAILED DESCRIPTION OF THE INVENTION

The presently disclosed embodiments are directed to apparatus and method for reducing power consumption in a mobile unit. Now referring to FIG. 2, block 200 illustrates a portion of a mobile unit, such as a cellular phone, used to illustrate some of the features of the present invention. Although block 200 shows only a portion of the mobile unit, block 200 is referred to as mobile unit 200 in the present application. It is noted that a "mobile unit" can be a single chip, also called a "device" in the present application; or, alternatively, the mobile unit can be a collection of a number of discrete devices and other components, such as a cellular phone. Moreover, although an embodiment of the invention is described by reference to a "mobile unit" throughout the present application, it is manifest that the present invention applies equally to "non-mobile units" and "non-mobile devices."

Mobile unit 200 comprises antenna 209 that is used to receive radio frequency (RF) signals from base station transceiver 214 by way of base station antenna 213. RF block 208 demodulates and downconverts the received RF signals for baseband processing. Some baseband processing blocks are not shown in FIG. 2. The baseband output of RF block 208 can include compressed voice packets. The compressed voice packets outputted by RF block 208 are provided to vocoder 206. Vocoder 206 decompresses the received compressed voice packets from the mobile unit's baseband processing, which is not shown in FIG. 2. Decompressed speech output of vocoder 206 provides input to audio mux 222.

Figure 2:
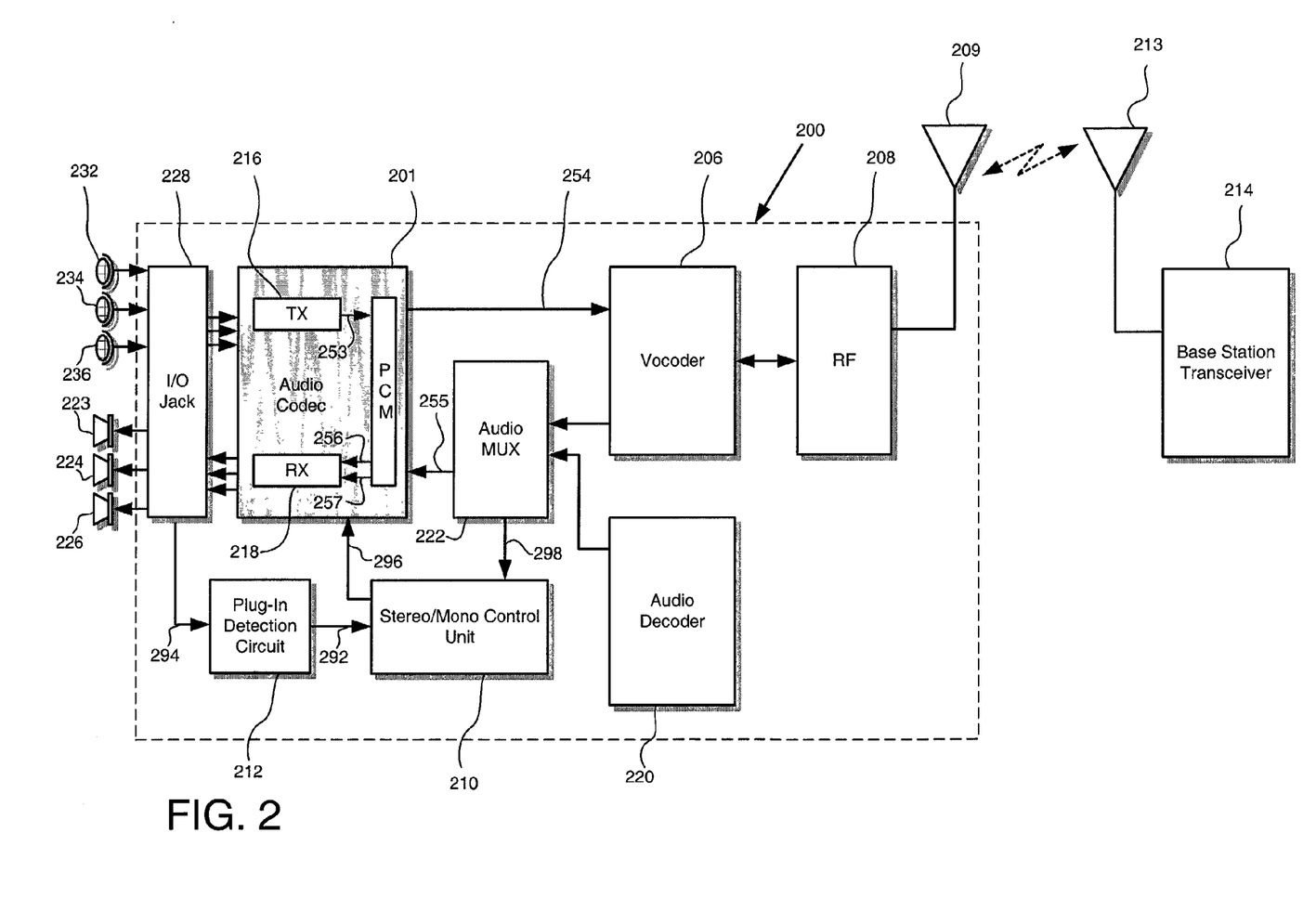
FIG. 2 illustrates an embodiment of the present invention utilizing a stereo/mono control unit in conjunction with a codec.

Audio mux 222 may alternatively accept input from audio decoder 220. Audio decoder 220 decompresses compressed audio formats such as, by way of a non-exhaustive example, MPEG layer 3 (MP3) compressed audio. Audio decoder 220 may output stereo or mono audio to audio mux 222.

Audio mux 222 provides PCM input to stereo audio codec 201 by way of PCM "output" signal 255. If PCM output signal 255 is stereo, then the audio signal is divided into two audio streams, namely left channel digital signal 256 and right channel digital signal 257. Left channel digital signal 256 and right channel digital signal 257 are inputted to receive audio processing path 218, which converts the signal from digital audio signals to analog audio signals. Audio analog signals are then outputted to earpiece speaker 223 or left headset speaker 224 and right headset speaker 226, which are connected to I/O jack 228.

On the reverse link, a user may input voice through mobile unit microphone 232, headset microphone 234, or auxiliary input 236 which are connected to I/O jack 228. I/O jack 228 provides an analog voice signal as input to transmit audio processing path 216 of stereo audio codec 201. Transmit audio processing path 216 converts the analog input signal to a PCM "input" signal 254. Stereo audio codec 201 provides PCM "input" signal 254 as input to vocoder 206 for voice compression. Vocoder 206 compressed voice packets are inputted to RF block 208. Data is upconverted and modulated onto carrier by RF block 208 for RF transmission by way of antenna 209. Base station antenna 213 receives RF transmission and base station transceiver 214 processes the received RF transmission.

According to one embodiment of the present invention, stereo/mono control unit 210 receives audio mux input 298 from audio mux 222. Stereo/mono control unit 210 also receives plug-in detection input 292 from plug-in detection circuit 212. Plug-in detection circuit 212 in turn receives I/O input 294 from I/O jack 228. As seen in FIG. 2, control output 296 of stereo/mono control unit 210 is coupled to stereo audio codec 201.

Figure 3:
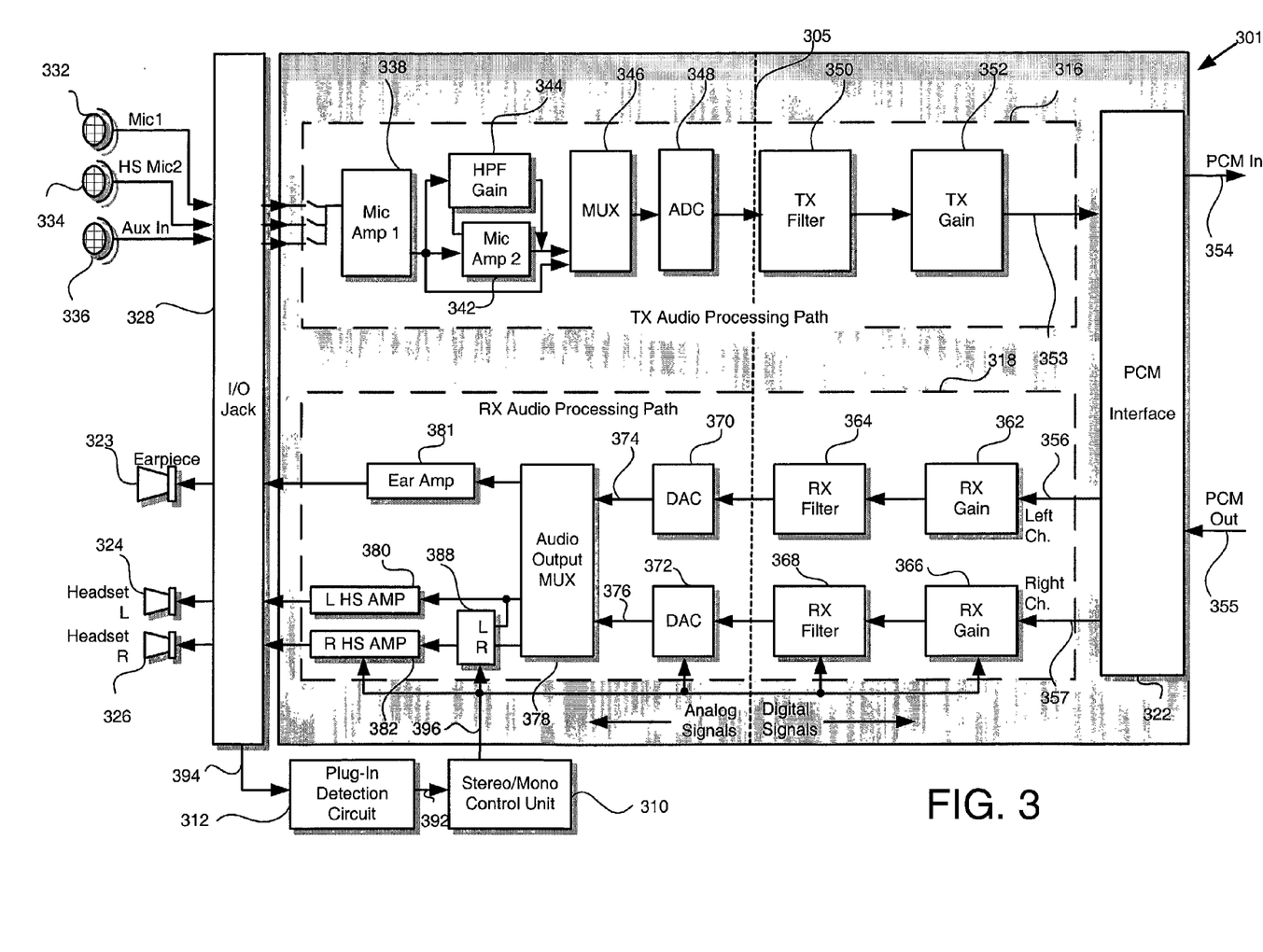
FIG. 3 illustrates in greater detail the codec shown in FIG. 2.

Stereo audio codec 201 is presented in more detail in FIG. 3. Exemplary stereo audio codec 301 consists of two audio processing paths 316 and 318. The transmit audio processing path 316 is used to convert the analog voice signal of the user to a digital voice signal. A description of transmit audio processing path 316 follows.

Voice signal input can originate from the mobile unit microphone 332, a headset microphone 334, or an auxiliary input 336, which are connected to stereo audio codec 301 by way of an I/O jack 328. I/O jack 328 provides input to a first microphone amp 338 that amplifies the input analog signal. The output analog signal of first microphone amp 338 may optionally be amplified again by a second microphone amp 342 and/or filtered by high pass filter and gain 344 depending on the type of input. For example, optional filtering may be performed on the auxiliary input 336.

Mux 346 may select output of high pass filter and gain 344 or it may select output of first microphone amp 338. The output of mux 346 is coupled to analog-to-digital converter 348, which converts an inputted analog voice signal to a digital voice signal. Signals to the right of divider 305 are digital signals. The digital voice signal is then filtered by transmit filter 350 and amplified by transmit gain 352 to produce transmitted voice PCM 353. Transmitted voice PCM 353 is sent to PCM interface 322, which is then sent for further processing such as voice compression via PCM "input" signal 354.

Receive audio processing path 318 is similar to transmit audio processing path 316 except that the signals flow in the opposite direction and that there are two signal paths for the left and right channels. PCM "output" signal 355 interfaces with stereo audio codes 301 by way of PCM interface 322.

If PCM output signal 355 is stereo, PCM interface 322 splits the PCM output signal 355 between left channel digital signal 356 and right channel digital signal 357 for separate processing in receive audio processing path 318. The left channel digital signal 356 is amplified by receive gain 362, which may provide volume control. Output of receive gain 362 is filtered by receive filter 364, which may provide interpolation of the signals. The digital signal output of receive filter 364 is converted to left channel audio analog signal 374 by digital-to-analog converter 370. Signals to the left of divider 305 are analog signals. The same audio processing is performed for the right channel with audio processing components receive gain 366, receive filter 368, and digital-to-analog converter 372.

Left and right channel analog audio signals 374 and 376, respectively, provide inputs to audio output mux 378. Audio output mux 378 directs analog outputs to either earpiece amp 381 or left and right headset amps 380 and 382, respectively, depending on whether earpiece speaker 323, left headset speaker 324, and/or right headset speaker 326 is connected to I/O jack 328.

Plug-in detection unit 312 receives I/O input 394 from I/O jack 328. Plug-in detection unit 312 determines the type of audio output device or devices that are connected to I/O jack 328. Plug-in detection circuit 312 provides plug-in detection input 392 to stereo/mono control unit 310. Stereo/mono control unit 310 provides control output 396 to right channel audio processing components, comprised of receive gain 366, receive filter 368, digital-to-analog converter 372, left/right selector 388, and right headset amp 382. Left channel analog audio signal 374 and right channel analog audio signal 376 can be passed through to left/right selector 388 via audio output mux 378. Control output 396 determines output of left/right selector 388, which output is coupled to right headset amp 382.

Stereo/mono control unit 210 is utilized to enable or disable audio processing components in the right channel, i.e. the "non-default" channel, for saving power in stereo audio codec 201. As discussed below, during mono audio applications, stereo/mono control unit 210 shuts down certain components in receive audio processing path 218. Stereo/mono controller 210 decides if the current audio application is mono based on whether audio mux input 298 is music, voice, or other and whether if the audio output devices that are connected to I/O jack 228 have mono or stereo capabilities.

For mono audio applications, in general, the audio processing components of the "non-default" channel, i.e. the right channel in the present exemplary embodiment, can be disabled because only one channel of audio processing is needed for mono operation. In the present exemplary embodiment, exemplary stereo audio codec 201 uses the left channel as the "default" mono channel.

As stated above, there are two inputs to stereo/mono control unit 210, audio mux input 298 and plug-in detection input 292. Audio mux input 298 can be voice, stereo music, mono music, or other. Plug-in detection input 292 can be either stereo or mono. Some examples of the many possible combinations of inputs for stereo/mono control unit 210 are described below.

A first combination of inputs occurs when audio mux input 298 is stereo music and plug-in detection input 292 is stereo. Since the audio output device connected to I/O jack 228 is stereo, both left headset speaker 224 and right headset speaker 226 need to be enabled. Also, since audio mux input 298 is stereo music, both left and right channel audio processing components need to be enabled. As shown in FIG. 3, left audio processing components consist of receive gain 362, receiver filter 364, and digital-to-analog converter 370 and right audio processing components consist of receive gain 366, receiver filter 368, and digital-to-analog converter 372. In this first combination, stereo/mono control unit 310 supplies control output 396 to ensure that right audio processing components are all enabled. Also, stereo/mono control unit 310 supplies control output 396 to left/right selector 388 such that right analog audio signal 376 is outputted from left/right selector 388.

A second combination of inputs occurs when audio mux input 298 is stereo music and plug-in detection input 292 is mono. Since the audio output device connected to I/O jack 228 is mono, left headset speaker 224 should be enabled and right headset speaker 226 should be disabled. Also, since audio mux input 298 is stereo music, depending on the user preference or audio application, the stereo channels can be added together in the digital domain and be inputted to the left channel receive audio processing path. For example, left channel digital signal 356 and right channel digital signal 357 can be added together digitally and be inputted to left channel receive audio processing components beginning with receive gain 362. Since the right channel receive audio processing components does not need to be enabled, stereo/mono control unit 310 should supply control output 396 such that right audio processing components are all disabled.

A third combination of inputs occurs when audio mux input 298 is voice or mono music and plug-in detection input 292 is mono. Since the audio output device connected to I/O jack 228 is mono, left headset speaker 224 should be enabled and right headset speaker 226 should be disabled. Also, since audio mux input 298 is voice or mono music, the left channel audio processing components should be enabled while all of the right channel audio processing components should be disabled. Therefore, in FIG. 3, stereo/mono control unit 310 supplies control output 396 such that right audio processing components, i.e. receive gain 366, receiver filter 368, digital-to-analog converter 372, and right headset amp 382 are all disabled.

A fourth combination of inputs occurs when audio mux input 298 is voice or mono music and plug-in detection input 292 is stereo. Since the audio output device connected to I/O jack 228 is stereo, left headset speaker 224 should be enabled and right headset speaker 226 should also be enabled. Also, since audio mux input 298 is voice or mono music, the left channel audio processing components should be enabled while right channel audio processing components receive gain 366, receiver filter 368, and digital-to-analog converter 372 should be disabled. Therefore, in FIG. 3, stereo/mono control unit 310 supplies control output 396 such that right channel receive gain 366, receive filter 368, and receive digital-to-analog converter 372 are all disabled and that right headset amp 382 is enabled. Also, stereo/mono control unit 310 supplies control output 396 to left/right selector 388 such that left analog audio signal 374 is output of left/right selector 388.

For the remaining combinations of inputs the stereo/mono control unit 310 may go into a default mode. In default mode, stereo/mono control unit 310 supplies control output 396 such that right channel receive gain 366, receive filter 368, digital-to-analog converter 372, and right headset amp 382 are all disabled.

Control output 396 may be comprised of multiple control signals, but for brevity, all control signals are represented by a single control output 396. For example, digital-to-analog converters are usually implemented in hardware and as such, control output 396 may be a simple enable/disable type of connection. However, receive gain 366 and receive filter 368 may be implemented in a digital signal processor. In this case, control output 396 might not be a simple disable signal as in the case for the digital-to-analog converter, but rather the control output 396 could be a command to the digital signal processor to enable or disable the firmware portion of the receive gain 366 and receive filter 368.

Figure 4:
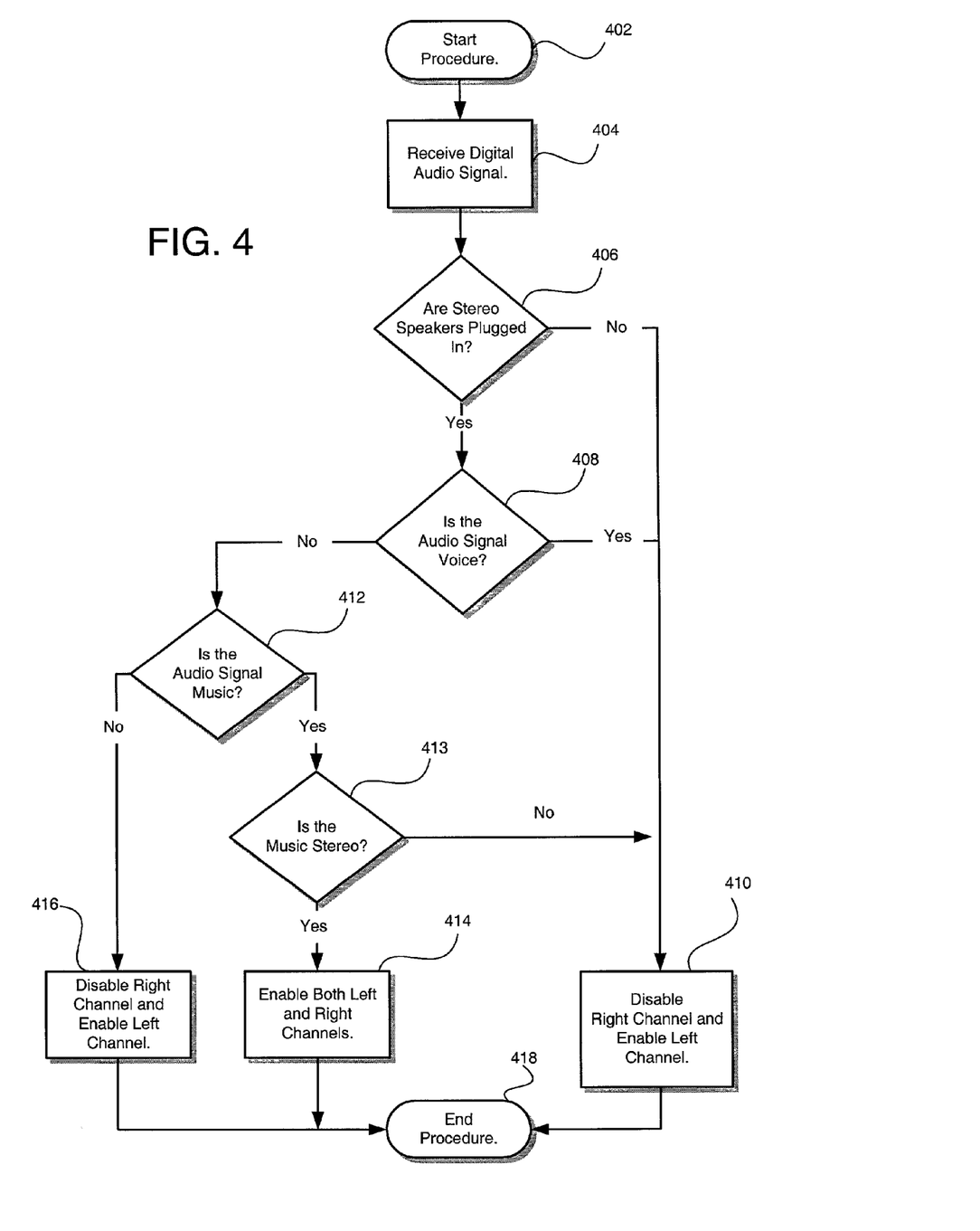
FIG. 4 is a flowchart describing the operation of an embodiment of the present invention.

The flowchart in FIG. 4 describes an exemplary operation of an embodiment of the present invention. Stereo/mono control unit 210 begins the procedure at step 402 when a mobile unit, such as a cellular phone, begins to power up or if the mobile unit is reset. In step 404, stereo/mono control unit 210 receives digital audio signals from audio mux 222 by way of audio mux input 298. Input digital audio signals can originate from either vocoder 206 or from audio decoder 220. Depending on the audio application or user preference either vocoder 206 or audio decoder 220 may be selected as the current input by way of audio mux 222. After step 404, stereo/mono control unit 210 proceeds to step 406.

In step 406, stereo/mono control unit 210 determines if stereo capable headset or speakers are plugged into I/O jack 228. Stereo capable headset or speakers are examples of what is generally referred to as a "stereo output component" in the present application. I/O jack 228 provides I/O input 294 to plug-in detection circuit 212, which in turn provides plug-in detection input 292 to stereo/mono control unit 210. If plug-in detection circuit 212 detects that a stereo headset is plugged-in, then stereo/mono control unit 210 proceeds to step 410, otherwise it proceeds to step 408.

In step 408, stereo/mono control unit 210 determines if audio mux input 298 is voice. If stereo/mono control unit 210 determines audio mux input 298 is voice, then stereo/mono control unit 210 proceeds to step 410, otherwise it proceeds to step 412.

In step 410, the stereo/mono control unit 210 disables the right channel audio processing components. Stereo/mono control unit 210 outputs control output 396 such that the right audio processing components receive gain 366, receiver filter 368, and digital-to-analog converter 372, and right headset amp 382 are disabled. After step 410, stereo/mono control unit 210 reaches end of the procedure at step 418.

In step 412, the stereo/mono control unit 210 determines if audio mux input 298 is music. If audio mux input 298 is music, then stereo/mono control unit 210 proceeds to step 413, otherwise it proceeds to step 416.

In step 413, the stereo/mono control unit 210 determines if the music signal from audio mux input 298 is stereo. If the music signal from audio mux input 298 is stereo, then stereo/mono control unit 210 proceeds to step 414, otherwise it proceeds to step 410.

In step 414, stereo/mono control unit 210 outputs control output 396 such that the right audio processing components receive gain 366, receiver filter 368, and digital-to-analog converter 372, and right headset amp 382 are enabled. In the present example, the left channel is the "default" mono channel and as such the left channel will be, by default, enabled for mono or stereo audio applications. After step 414, stereo/mono control unit 210 reaches end of the procedure at step 418.

In step 416, stereo/mono control unit 210 outputs control output 396 such that the right audio processing components receive gain 366, receiver filter 368, and digital-to-analog converter 372, and right headset amp 382 are disabled. As stated above, the left channel is the "default" mono channel and as such, the left channel will be enabled, by default, for mono or stereo audio applications. After step 416, stereo/mono control unit 210 reaches end of the procedure at step 418.

According to various embodiments of the invention, and also the particular embodiment of the invention described herein, disabling components of a "non-default" channel, such as the right audio processing components receive gain 366, receiver filter 368, and digital-to-analog converter 372, and right headset amp 382 saves significant amounts of power.

It is appreciated by the above description that the invention provides apparatus and method for reducing power consumption in a mobile unit. From the above description, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, apparatus and method for reducing power consumption in a mobile unit have been described.

The invention claimed is:

1. A device adapted to communicate with an audio mux, the audio mux receiving a vocoder input from a vocoder and an audio decoder input from an audio decoder, the device comprising:
   a stereo/mono control unit coupled to a codec; and
   a plug-in detection circuit for determining a type of an audio output device coupled to an I/O jack and outputting the determined type of the audio output device to the stereo/mono control unit;
   wherein the determined type of audio output device is one of a stereo capable device and a mono capable device;
   wherein the stereo/mono control unit receives an audio mux input identifying a type of a signal that the codec received from the audio mux, and the stereo/mono control unit provides a control output to the codec based on the determined type of the audio output device and the identified type of the signal.

2. The device of claim 1 wherein the control output is coupled to a plurality of components in a receive audio processing path of the codec.

3. The device of claim 2 wherein the plurality of components are in one of a right channel of the receive audio processing path and a left channel of the receive audio processing path.

4. The device of claim 2 wherein the control output disables at least one of the plurality of components to reduce power consumption in the receive audio processing path of the codec.

5. The device of claim 2 wherein the plurality of components comprise a receive gain, a receive filter, a digital-to-analog converter, a left/right selector, and a headset amp.

6. The device of claim 1 wherein the control output disables at least one of a plurality of components in a receive audio processing path of the codec when the identified type of the signal is a voice signal.

7. The device of claim 6 wherein the plurality of components comprise a receive gain, a receive filter, a digital-to-analog converter, a left/right selector, and a headset amp.

8. A method for processing received audio signals in a device, the method comprising:
  determining a type of an audio output device coupled to an I/O jack;
  determining a type of the received audio signals; wherein the received audio signals are received at the device for output to the audio output device, and wherein the type identifies whether a signal provided to an audio codec by an audio multiplexer is one of voice, stereo music, and mono music; and
  providing a control output to disable or enable a first channel in a receive audio processing path based on the type of the audio output device and the type of the received audio signals.

9. The method of claim 8, further comprising:
  disabling the first channel in the receive audio processing path and enabling a second channel in the receive audio processing path when the type of the received audio signals is mono signals; and
  enabling the first channel in the receive audio processing path and enabling the second channel in the receive audio processing path when the type of the received audio signals is stereo signals, wherein the disabling of the first channel is performed by a stereo/mono control unit.

10. The method of claim 9 wherein the disabling of the first channel is performed by the control output of the stereo/mono control unit disabling at least one of a plurality of components in the first channel;
  wherein one of the first channel is a right channel in the receive audio processing path and the second channel is a left channel in the receive audio processing path and;
  the first channel is a left channel in the receive audio processing path and the second channel is a right channel in the receive audio processing path.

11. The method of claim 10 wherein the plurality of components comprise a receive gain, a receive filter, a digital-to-analog converter, a left/right selector, and a headset amp.

12. The method of claim 9 wherein the device comprises a vocoder and an audio decoder, wherein the vocoder provides voice signals to an audio mux, and wherein the audio decoder provides music signals to the audio mux.

13. The method of claim 12 wherein the stereo/mono control unit receives the audio signals from the audio mux.

14. The method of claim 8 wherein the type of the audio output device is a stereo output component.

15. The method of claim 14 further comprising disabling the first channel when the stereo output component is not coupled to the device.

16. The method of claim 8,
  wherein the type of the audio output device is capable of outputting a given type of audio signals, and
  wherein the type of the received audio signals is determined to be different than the given type of audio signals.

17. The method of claim 8, wherein the receive audio processing path is not associated with audio signals received from the audio output device.

18. The method of claim 8, further comprising:
  disabling the first channel in response to the control output by reducing power at one or more components within the device.

19. The method of claim 8,
  wherein the type of the audio output device is determined to be stereo-capable, and
  wherein the control output is provided to disable the first channel in the receive audio processing path.

20. The method of claim 8, wherein the type of the received audio signals is determined to be stereo.

21. An apparatus for selectively reducing power consumption in an audio codec that includes a plurality of components, the apparatus comprising:
  a stereo/mono control unit having a first input for receiving an audio multiplexer input that identifies whether a signal provided to the audio codec by the audio multiplexer is one of voice, stereo music, and mono music;
  a second input for receiving a plug-in detection input that identifies whether an audio output device coupled an I/O jack is stereo capable or mono capable; and
  an output for providing a control output; wherein the stereo/mono control unit generates the control output based on the audio multiplexer input and the plug-in detection input;
  wherein the control output is provided to the audio codec and selectively reduces the power consumption in the audio codec.

22. The apparatus of claim 21 further comprising:
  an audio multiplexer, coupled to the stereo/mono control unit, for providing the audio multiplexer input to the stereo/mono control unit.

23. The apparatus of claim 21 further comprising:
  a plug-in detection circuit, coupled to the stereo/mono control unit, for providing the plug-in detection input to the stereo/mono control unit.

24. An apparatus for selectively reducing power consumption in an audio codec that includes a plurality of components, the apparatus comprising:
  means for determining a type of an audio output device coupled to an I/O jack;
  means for determining a type of the received audio signals; wherein the received audio signals are received at the device for output to the audio output device, and wherein the type identifies whether a signal provided to the audio codec by the audio multiplexer is one of voice, stereo music, and mono music; and
  means for providing a control output to disable or enable a first channel in a receive audio processing path based on the type of the audio output device and the type of the received audio signals.

25. The apparatus of claim 24, further comprising:
  means for disabling the first channel in the receive audio processing path and enabling a second channel in the receive audio processing path when the type of the received audio signals is mono signals; and
  means for enabling the first channel in the receive audio processing path and enabling the second channel in the receive audio processing path when the type of the received audio signals is stereo signals,
  wherein the disabling of the first channel is performed by a stereo/mono control unit.

26. The apparatus of claim 25 wherein the disabling of the first channel is performed by the control output of the stereo/mono control unit disabling at least one of a plurality of components in the first channel;
  wherein one of the first channel is a right channel in the receive audio processing path and the second channel is a left channel in the receive audio processing path, and the first channel is a left channel in the receive audio processing path and the second channel is a right channel in the receive audio processing path.

27. The apparatus of claim 24 further comprising:
  means for disabling the first channel when a stereo output component is not coupled to the device.

28. A computer readable media embodying logic for processing received audio signals in a device, the logic configured to perform a method comprising:
- determining a type of an audio output device coupled to an I/O jack;
- determining a type of the received audio signals;
- wherein the received audio signals are received at the device for output to the audio output device, and wherein the type identifies whether a signal provided to the audio codec by the audio multiplexer is one of voice, stereo music, and mono music; and
- providing a control output to disable or enable a first channel in a receive audio processing path based on the type of the audio output device and the type of the received audio signals.

29. The computer readable media of claim 28, further comprising:
- disabling the first channel in the receive audio processing path and enabling a second channel in the receive audio processing path when the type of the received audio signals is mono signals; and
- enabling the first channel in the receive audio processing path and enabling the second channel in the receive audio processing path when the type of the received audio signals is stereo signals, wherein the disabling of the first channel is performed by a stereo/mono control unit.

30. The computer readable media of claim 29 wherein the disabling of the first channel is performed by the control output of the stereo/mono control unit disabling at least one of a plurality of components in the first channel;
- wherein one of the first channel is a right channel in the receive audio processing path and the second channel is a left channel in the receive audio processing path and the first channel is a left channel in the receive audio processing path and the second channel is a right channel in the receive audio processing path.

31. The computer readable media of claim 30 wherein the plurality of components comprise a receive gain, a receive filter, a digital-to-analog converter, a left/right selector, and a headset amp.

32. The computer readable media of claim 28 further comprising disabling the first channel when a stereo output component is not coupled to the device.

* * * * *